GLUCOSE MEASURING SYSTEM
Filed July 15, 1968
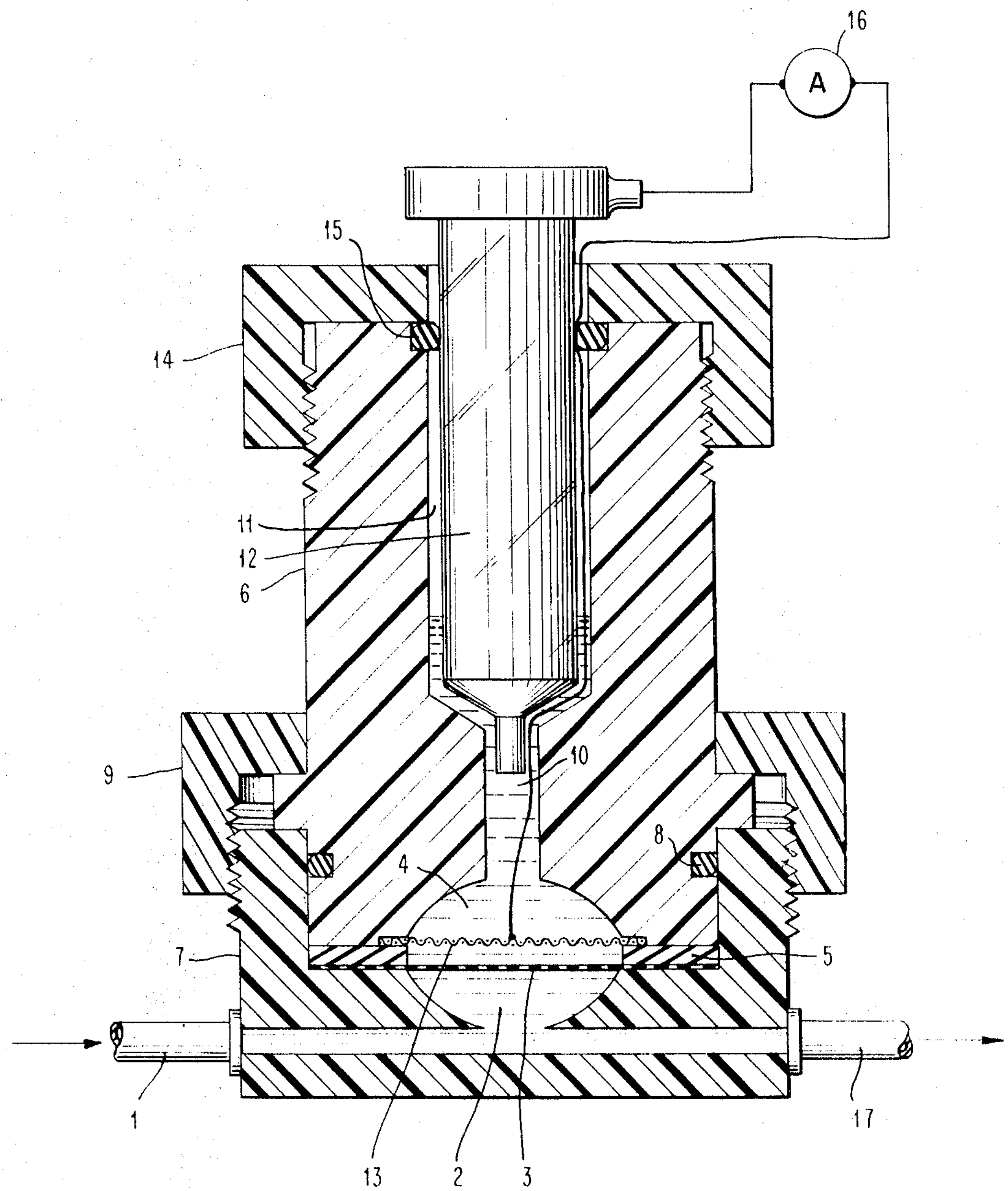
INVENTORS
GORDON W. NEFF
CARLOS J. SAMBUCETTI
JOHN E. TOMKO
BY John A. Jordan
ATTORNEY United States Patent Office 3,591,480

Patented July 6, 1971

3,591,480
GLUCOSE MEASURING SYSTEM

Gordon W. Neff, Mahopac, Carlos J. Sambucetti, Mohegan Lake, and John E. Iomko, Poughkeepsie, N.Y., assignors to International Business Machines Corporation, Armonk, N.Y.

Filed July 15, 1968, Ser. No. 745,007
Int. Cl. G01n *27/32, 27/40, 27/42*
U.S. Cl. 204—195 9 Claims

ABSTRACT OF THE DISCLOSURE

A measuring system is provided which directly measures the concentration of glucose in biological fluids. Glucose from a biological fluid is diffused through a semipermeable membrane into a reaction chamber and is catalyzed by the enzyme glucose oxidase whereupon gluconic acid and hydrogen peroxide are formed. Iodide ions in the reaction chamber then effect the decomposition of the hydrogen peroxide to form iodine and water. Then a platinum and calomel electrode, coupled via an electrolyte solution, act to cause galvanic coulometric reduction of the iodine to regenerate iodide. At steady state the only current-regulating mechanism is the diffusion of glucose across the membrane, which is a linear function of concentration.

BACKGROUND OF THE INVENTION

The present invention relates to a method and apparatus for the analysis of organic substances in biological fluids and more particularly to a method and apparatus for directly measuring the concentration of glucose in biological fluids.

Determination of the concentration of organic constituents of biological fluids such as blood is of great importance in the fields of medicine and biochemistry. For example, the ability to directly, accurately, quickly and simply determine the concentration of organic species such as glucose in biological fluids, such as blood, would be a valuable and important aid to the medical practitioner and diagnostician.

The importance of such an aid can be demonstrated by reference to diabetic patients who must control their diets so as to regulate their sugar intake and who must frequently be guided in this regard by a regular check on glucose in their body fluids. More importantly, accurate and sensitive determination of glucose concentration is a valuable aid to detection of early diabetes.

Heretofore, a commonly used analysis process for determining the amount of glucose present in biological fluids involved the catalytic action of the enzyme glucose oxidase on a test sample of the glucose. In response to the catalytic action the glucose experiences aerobic oxidation whereby a reaction product of gluconic acid and hydrogen peroxide is formed. The rate of reaction and the amount of the reaction product formed thereby are a function of the amount of glucose present in the test sample.

A common prior art approach to determining glucose concentration via the enzymatic glucose reaction involves a cumbersome colorimetric testing arrangement to determine the rate of reaction. Because such an approach is dependent upon the rate of reaction, complicated timing mechanisms have to be used to effect a reading, at a precise interval of time.

The problem with colorimetric testing systems, along with other prior art testing systems used in the analysis of organic species in biological fluids, lies in the fact that the measurement approach is not direct but rather involves complicated systems and steps to provide indirect determination. For example, it is often necessary, prior to test, to use some form of separation process to physically separate certain constituents from the whole fluid.

In addition to separation steps, prior art techniques often require accurate preparation of reagents as well as volumetric samples or additions for each test run.

The complexity of these procedures and steps results in a testing system susceptible to error. In this respect it has been questioned whether, in many instances, the test results obtained are truly representative of the composition of the original test sample. This is particularly true where testing procedures subject the original sample to drastic change. A drastic change may, often, not only affect the test results but may also destroy the test sample beyond usefulness. This is particularly disadvantageous where a large test sample is required.

The end result of the prior art approach is that a lengthy, inaccurate and unnecessarily complicated test cycle is involved which often results in the destruction of a relatively large test sample.

SUMMARY OF THE INVENTION

The present invention overcomes the prior art disadvantages by providing a novel, compact, self-powered electrochemical testing arrangement wherein small samples of whole fluid may be directly analyzed without the necessity of involving any complex preparation therefor. "Whole fluid" as used herein means biological solution including suspensions therein.

The system as provided by the preferred embodiment of the present invention, provides for the direct measurement of glucose diffused from whole fluid by utilizing both an enzymatic reaction system and a calomel-platinum electrode system communicating via an electrolyte-solution. Iodide ions in the reaction chamber effect the decomposition of the hydrogen peroxide of the reaction product to form water and iodine. The calomel and platinum electrodes, arranged in the electrolyte solution, act to cause galvanic coulometric reduction of the iodine to regenerate iodide and to thereby provide a self-powered cellular measuring system which is both accurate and sensitive. An ammeter connected between the calomel and platinum electrodes measures the current involved in the coulometric reduction to provide a continuous output indication which is directly determinative of the concentration of glucose in the biological fluid. It is evident that the novel concepts utilized in the preferred embodiment colud be equally applied to the measurement of concentration of other than glucose.

The significance of being able to work directly with small samples of whole fluid is evident when it is recognized that such allows a direct "on-line" measurement approach. Thus, a fluid system tapped to provide a continuous sample may be continuously analyzed on a "real-time" basis. Moreover, since the testing system used in accordance with the present invention is nondestructive to the test sample, the testing arrangement may be included in the fluid system loop.

There is thus provided a compact and sensitive electrochemical testing system for the measurement of glucose in biological fluids which has the advantages of being simple, direct, accurate, self-powered, rapid and nondestructive to the test sample. Because of the foregoing advantages, the system has the additional attendant advantages that it may be used "on-line" with the source of fluid under analysis and even "in-loop" with a fluid system to provide a continuous output indication indicative of the glucose concentration.

It is therefore an object of this invention to provide an improved system for the analysis of glucose in biological fluids.

It is an additional object of this invention to provide a simple and a rapid system for the direct measurement of the concentration of glucose in biological fluids.

It is yet an additional object of this invention to provide a simple system for the analysis of species in biological fluids which acts directly on whole fluids.

It is still a further object of this invention to provide a system for the analysis of species in biological fluids which is nondestructive to the fluid sample under analysis.

It is yet another object of this invention to provide a system for the analysis of glucose in biological fluids which obviates any need for complex apparatus, steps or preparation.

It is still yet another object of this invention to provide a system for the analysis of glucose in biological fluids which requires small quantities of the sample analyzed.

It is yet a further object of this invention to provide a simple system for the analysis of glucose in biological fluids which may be used "on-line" or "in-loop" with a fluid system so as to continuously sample and analyze fluid from the system to provide a direct, and continuous indication proportional to the concentration of the glucose being analyzed.

It is yet still a further object of this invention to provide an accurate and sensitive system for the direct measurement of the concentration of glucose in biological fluids which is compact and self-powered.

The foregoing and other objects, features and advantages of the invention will be apparent from the following more particular description of a preferred embodiment of the invention, as illustrated in the accompanying drawing.

The drawing shows a schematic cross-sectional representation of a preferred embodiment of the glucose measuring system in accordance with the present invention.

DESCRIPTION OF INVENTION

The system, as provided by the present invention, accepts biological fluid, such as blood or urine, at capillary 1, as indicated by the arrow adjacent thereto. The whole fluid is delivered to sample cavity 2. From sample cavity 2 the glucose then diffuses across semipermeable membrane 3 into reaction chamber 4 holding an electrolyte solution containing the enzyme, glucose oxidase.

Rubber washer 5 acts both to hold membrane 3 in place and to provide a seal between the end surface of cellular body 6 and the inner surface of cap 7. Rubber ring 8 provides an additional seal and tightening collar 9 acts to hold cellular body 6 and cap 7 tightly together so that rubber washer 5 will provide an effective seal.

Channel 10 links the electrolyte filled chamber 4 and small concentric chamber 11 so that an electrochemical path exists between calomel electrode 12 and platinum screen electrode 13. Any of a variety of well known strong electrolyte buffer solutions may be used so long as such a solution includes ingredients to provide iodide ions in reaction chamber 4.

In the arrangement shown in the drawing effective results were obtained using a standard, commercially available, calomel electrode and an electrolyte composition containing 1 molar of KCL, .05 molar of KI, .025 molar of $KH_2PO_4$, .001 molar of $(NH_4)_2MO_4$ and .025 molar of $K_2HPO_4$. Also included was .5 gram percent in powder form of the enzyme glucose oxidase but it is clear that different forms of the glucose oxidase enzyme could be used. For example, a rigid form of glucose oxidase could be held in the reaction chamber.

As can be seen from the drawing, cap 14 tightens down on cellular body 6 to cause rubber ring 15 to provide a seal between the cellular body and calomel electrode 12. Ammeter 16 couples one end of calomel electrode 12 to platinum screen electrode 13.

DESCRIPTION OF OPERATION

Whole fluid glucose from the fluid sample in sample cavity 2 diffuses through semipermeable membrane 3 into reaction chamber 4. Membrane 3 is sufficiently permeable to diffuse glucose from the fluid sample into the reaction chamber 4 but is impermeable to the glucose oxidase in the reaction chamber. In this respect the glucose diffusion process occurs spontaneously because of the energy difference due to concentration gradient existing between the fluid sample in the sample cavity and the fluid reaction product composition in the reaction chamber. As will be explained in more detail hereinafter this concentration gradient is continuously maintained through system electrochemical operations which act to remove and consume the reaction product.

The glucose oxidase in reaction chamber 4 catalyzes the oxidation of glucose diffusing through membrane 3 whereby a reaction product of gluconic acid and hydrogen peroxide are formed. Since reaction chamber 4 contains iodide ions the hydrogen peroxide then experiences decomposition such that:

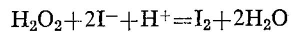

$$H_2O_2+2I^-+H^+=I_2+2H_2O$$

This reaction is catalyzed by the traces of ammonium molybdate in the electrolyte solution.

According to the novel aspects of the present invention a galvanic coulometric system then reduces the iodine thus formed to regenerate the consumed iodide ions:

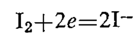

$$I_2+2e=2I^-$$

Galvanic coulometric reduction is provided by the electrochemical action between calomel electrode 12 and platinum electrode 13. The electrodes are electrochemically coupled on one side by the electrolyte solution in channel 10 and chamber 4 and are electrically coupled on the other by ammeter 16. The electrochemical action includes a calomel electrode mechanism whereby electrons needed for the iodine reduction are provided.

That mechanism involves the oxidation of a metal at the calomel electrode. Thus, if the calomel electrode is of the type that uses a mercury-mercurous chloride system the mercury will oxidize to make available electrons for the reduction of iodine. The platinum electrode and iodine provide a system to consume these available electrons and the energy developed by the calomel electrode is sufficient to sustain the process. Accordingly, the electrons made available at the calomel electrode provide for the reduction of iodine at the platinum electrode and the current in ammeter 16 is indicative of the rate of reduction. It is clear that the reduction of iodine regenerates iodide ions which in turn are available for the decomposition of the hydrogen peroxide.

Thus, the galvanic coulometric system behaves as a fuel cell consuming in the process the hydrogen peroxide of the reaction product. It can be seen, then, that the system operates without the necessity of an external source such as a battery. It should be noted that since the electrochemical reduction of iodine regenerates iodide, there is no net change in the composition of the electrolyte solution except for the possible accumulation of gluconic acid. The latter, however, is easily neutralized by the strong buffer power of the electrolyte solution.

It is important to realize that because of the coulometric system the membrane 3 not only acts as a means for extracting glucose but also acts as a regulating mechanism to control the speed of the total process. Thus, membrane 3 becomes the rate determining factor at steady state varying in diffusion rate only as a function of concentration.

This can be explained by noting that when blood first diffuses into the reaction chamber there is little glucose present therein and the concentration thereof is therefore small. At this point enzyme action is dependent upon the glucose concentration in the reaction chamber. Accordingly, only a fraction of the glucose molecules are being converted. Thus, there begins an accumulation of glucose in the reaction chamber. The current through ammeter 16 is thus indicative of the increasing concentration in reaction chamber 4.

As accumulation continues and glucose builds up in the reaction chamber an increase in the rate of enzyme reaction occurs. To aid in the enzyme reaction the enzyme may be catalyzed by adding traces of gelatin thereto or by suspending the enzyme preparation with iron. The increase in the rate of enzyme reaction is supported by the action of the coulometric system through the effect of mass action law.

The accumulation of glucose and corresponding increase in glucose concentration in the reaction chamber cause a decrease in the diffusion rate of glucose across the membrane. As the diffusion rate diminishes, resulting in a corresponding diminution in the rate of increasing glucose concentration, a stable state is reached where the glucose diffusion rate matches the current rate at which glucose is being used in the enzyme reaction. At this point the glucose concentration in the reaction chamber is no longer increasing but has become constant. This is clearly so because the number of glucose molecules converted by the enzyme reaction per unit of time corresponds to the number diffusing through membrane 3 per unit of time.

Thus, in accordance with the novel aspects of the present invention a steady state direct current output is provided notwithstanding the fact that glucose is continuously being converted. This appears to have not been possible heretofore where glucose concentration measurement was dependent upon rate of enzyme reaction. The system as provided herein is not dependent upon the rate of reaction and, thus, a continuous direct current output representation indicative of glucose concentration is possible. This can be explained by noting that when the glucose in reaction chamber 4 has reached constant concentration the ammeter 16 output indication is only dependent upon the rate of glucose diffusion through the membrane. At this point this is the only rate determining mechanism and current controlling factor and this rate of glucose diffusion is a linear function of glucose concentration.

It has been found that the measuring arrangement as provided by the present invention will operate on as little as a 20 microliter sample. Moreover, it has been found that the novel arrangement is sensitive enough to accurately measure anywhere from 0 to 10 mg. of glucose per 100 cubic centimeters of urine and anywhere from 0 to 1000 mg. of glucose per 100 cubic centimeters of blood. Such sensitivity allows for the detection of early diabetes and serious hypergluconic conditions.

Thus, it can be seen that the novel measuring system described provides a simple, compact, self-powered and accurate testing arrangement which acts nondestructively on small samples of whole fluid to provide a direct current output indication which directly varies as a linear function of the glucose concentration in the test sample. Because of these characteristics it is clear that such a system has use potential anywhere from its utilization in a complex computer controlled biological analysis arrangement to portable desk application.

While the invention has been particularly shown and described with reference to a preferred embodiment thereof, it will be understood by those skilled in the art that various changes in form and details may be made therein without departing from the spirit and scope of the invention.

What is claimed is:

1. A system for directly measuring the concentration of glucose in a biological fluid comprising:

sample cavity means for storing a sample of said fluid;

reaction chamber means containing an electrolyte solution and having included therein both a reagent means to cause a reaction involving said glucose to produce a reaction product of hydrogen peroxide and a chemical decomposition means to cause the decomposition of said reaction product;

membrane means for diffusing said glucose from said fluid in said sample cavity into said reaction chamber;

electrochemical means for regenerating said chemical decomposition means as it is consumed in decomposition to cause said reaction involving said glucose to stabilize which thereby stabilizes the glucose concentration in said reaction chamber and thus allows the rate of said diffusing of said glucose to be indicative of the glucose concentration of said fluid in said sample chamber; and means coupled to said electrochemical means to measure the rate at which said electrochemical means is regenerating said chemical decomposition means.

2. A system for directly determining the concentration of glucose in a whole biological fluid comprising:

reaction chamber means containing an electrolyte solution;

sample cavity means for receiving said biological fluid;

membrane means for diffusing said glucose from said whole fluid in said sample cavity means into said chamber means;

means included in said electrolyte solution in said chamber means including both means for effecting chemical change in the glucose diffusing into said chamber means to produce a reaction product and means for decomposing said reaction product as it is formed thereby so that the rate of diffusion of said glucose into said chamber is a function of the concentration of said glucose in said fluid; and electrochemical means in contact with said electrolyte solution in said chamber means to both regenerate said means for decomposing and at the same time indicate the rate of diffusion.

3. A system as in claim 2 wherein said means for effecting chemical change includes glucose oxidase.

4. An apparatus for directly determining the concentration of glucose in a biological fluid comprising:

reaction chamber means containing an electrolyte solution;

sample cavity means for receiving said biological fluid;

membrane means for separating said electrolyte solution in said reaction chamber means from said biological fluid in said sample cavity means and for diffusing the glucose in said fluid into said electrolyte solution in said reaction chamber means at a rate corresponding to the glucose concentration gradient existing between said electrolyte solution and said biological fluid;

reagent means included in said reaction chamber means for causing the glucose diffused into said reaction chamber means to undergo chemical reaction in said electrolyte solution to produce a reaction product at a rate proportional to the rate of diffusion of glucose;

and means included in said electrolyte solution in said reaction chamber means for reducing said reaction product therein to thereby maintain the said glucose concentration gradient so that said glucose diffuses through said membrane at a rate corresponding to the glucose concentration in said fluid, and further means included in said electrolyte solution for electrochemically regenerating said means for reducing said reaction product at a rate proportional to said diffusion rate thereby providing an output indication which is directly proportional to the concentration of said glucose in said biological fluid.

5. A system for the measurement of the concentration of glucose in a biological fluid including:

reaction chamber means containing an electrolyte solution and having a receiving opening covered with a semipermeable membrane for containing said electrolyte solution and for diffusing glucose from said biological fluid into said chamber;

means included in said chamber means for causing chemical conversion of the diffused glucose to hydrogen peroxide;

further chemical means included in said electrolyte solution within said chamber means for decomposing said hydrogen peroxide;

electrochemical means including first and second electrode means in contact with said electrolyte solution for regenerating said chemical means for decomposing at a rate corresponding to the rate of said decomposing and means coupled between said first and second electrode means for responding to the current generated in regenerating the said chemical means whereby said current is indicative of the concentration of said glucose in said fluid.

6. A system as in claim 5 wherein said further chemical means includes iodide ions which convert to iodine upon decomposing said hydrogen peroxide.

7. A system as in claim 6 wherein the said first and second electrode means of said electrochemical means include a calomel electrode and platinum electrode which act to chemically reduce said iodine to thereby regenerate iodide ions.

8. An electrochemical analysis system for directly determining the glucose concentration in whole biological fluid comprising:

a reaction chamber containing an electrolyte solution and having an entrance opening for entering said glucose into said electrolyte solution;

sample cavity means for receiving said biological fluids;

membrane means for separating said electrolyte solution in said reaction chamber from fluid in said sample cavity means and for diffusing the glucose in said fluid through said entrance opening into said reaction chamber;

reagent means included in said electrolyte solution within said reaction chamber for converting said glucose into hydrogen peroxide;

ion means included in said electrolyte solution within said reaction chamber for reducing said hydrogen peroxide whereby said ion means becomes oxidized; and galvanic means including first and second electrode means in contact with said electrolyte solution for regenerating said ion means by reducing said ion means that become oxidized to thereby generate a current indicative of the rate of regenerating which rate is directly proportional to the concentration of glucose in said biological fluid.

9. A system for directly measuring the concentration of glucose in a biological fluid comprising:

sample cavity means for storing a sample of said fluid;

reaction chamber means containing an electrolyte solution and having included therein both a glucose oxidase reagent to cause a reaction involving said glucose to produce a reaction product of hydrogen peroxide and iodide ions to cause the decomposition of said reaction product to thereby produce iodine;

membrane means separating said electrolyte solution in said reaction chamber means from said fluid in said sample cavity means and for diffusing said glucose from said fluid in said sample cavity means into said electrolyte solution within said reaction chamber means at a rate corresponding to the glucose concentration gradient existing between said electrolyte solution and said biological fluid;

electrochemical means including a calomel electrode and a platinum electrode in contact with said electrolyte solution for regenerating said iodide ions from said iodine as said iodide ions are consumed in the said decomposition of said reaction product of hydrogen peroxide to thereby stabilize said reaction involving glucose and glucose oxidase whereby the glucose concentration in said reaction chamber stabilizes thus allowing the rate of said diffusing of said glucose to be indicative of the glucose concentration in said fluid within said sample cavity; and means coupled between said calomel electrode and said platinum electrode to measure the rate at which said ions are regenerated.

References Cited

UNITED STATES PATENTS

| | | | |
|---|---|---|---|
| 3,234,117 | 2/1966 | Rost et al. | 204—195 |
| 3,314,864 | 4/1967 | Hersch | 204—195X |
| 3,367,849 | 2/1968 | Blaedel et al. | 204—1 |
| 3,380,905 | 4/1968 | Clark, Jr. | 204—195 |
| 3,404,069 | 10/1968 | Ware | 195—103.5 |

OTHER REFERENCES

Leland C. Clark, Jr. et al.; Ann. N.Y. Acad. of Science, vol. 102, pp. 39–41, Oct. 31, 1962.

GERALD L. KAPLAN, Primary Examiner

U.S. Cl. X.R.

23—230; 195—103.5; 204—IT